(12) United States Patent  
Molnar

(10) Patent No.: US 7,016,436 B1
(45) Date of Patent: Mar. 21, 2006

(54) SELECTIVE JOINT DEMODULATION SYSTEMS AND METHODS FOR RECEIVING A SIGNAL IN THE PRESENCE OF NOISE AND INTERFERENCE

(75) Inventor: Karl J. Molnar, Cary, NC (US)

(73) Assignee: Ericsson, Inc., RTP, NC (US)

( * ) Notice: Subject to any disclaimer, the term of this patent is extended or adjusted under 35 U.S.C. 154(b) by 0 days.

(21) Appl. No.: 09/464,830

(22) Filed: Dec. 17, 1999

(51) Int. Cl.
    H04B 1/69   (2006.01)
    H03D 1/04   (2006.01)
(52) U.S. Cl. ................................. 375/346; 375/340
(58) Field of Classification Search ................ 375/346, 375/316, 354, 364, 368, 267, 148, 340; 370/345, 370/310, 347, 201; 342/378, 373; 455/562, 455/501; 329/316
See application file for complete search history.

(56) References Cited

U.S. PATENT DOCUMENTS

| | | | | |
|---|---|---|---|---|
| 5,214,391 A | * | 5/1993 | Serizawa et al. | 329/316 |
| 5,222,106 A | * | 6/1993 | Satoh et al. | 375/102 |
| 5,506,861 A | | 4/1996 | Bottomley | 375/200 |
| 5,640,432 A | | 6/1997 | Wales | 375/346 |
| 5,787,122 A | * | 7/1998 | Suzuki | 375/267 |
| 5,790,529 A | * | 8/1998 | Haber | 370/536 |
| 5,819,168 A | * | 10/1998 | Golden et al. | 455/303 |

(Continued)

FOREIGN PATENT DOCUMENTS

DE          196 16 828 A1    11/1997

OTHER PUBLICATIONS

U.S. Appl. No. 09/143,821, filed Aug. 31, 1998, Bottomley.

(Continued)

*Primary Examiner*—Young T. Tse
*Assistant Examiner*—Sam K. Ahn
(74) *Attorney, Agent, or Firm*—Myers Bigel Sibley & Sajovec, PA

(57) ABSTRACT

A signal is received in the presence of noise and interference by demodulating the signal when a relationship between the signal and the noise and the interference meets a criterion, and by jointly demodulating the signal when the relationship between the signal and the noise and the interference does not meet the criterion. Moreover, the signal may be demodulated if a relationship between the noise and the interference meets a second criterion and may be jointly demodulated if the relationship between the noise and the interference does not meet the second criterion. More specifically, demodulation may be performed when the signal-to-noise-and-interference ratio exceeds a first threshold and joint demodulation may be performed when the signal-to-noise-and-interference ratio is less than the first threshold. Moreover, the signal may be jointly demodulated if the interference-to-noise ratio exceeds a second threshold, and the signal may be demodulated if the interference-to-noise ratio is less than the second threshold. Thus, if the desired signal power is high relative to noise and interference, joint demodulation may be skipped and demodulation may be performed. Moreover, if the desired signal power is not large compared to interference-and-noise, joint demodulation may be used only when the interference power is high relative to the noise power. Finally, an interfering signal's synchronization word may be found in the received signal, and the power of the interfering signal relative to the noise power may be determined from the located interfering signal synchronization word, to thereby determine the interference-to-noise ratio. Moreover, the interfering signal's synchronization word that is detected can provide improved estimation of the interfering signal's channel estimate, which can be estimated in terms of the interfering signal's medium response compared to the composite channel response.

27 Claims, 5 Drawing Sheets

U.S. PATENT DOCUMENTS

| | | | | |
|---|---|---|---|---|
| 5,970,060 | A | | 10/1999 | Baier et al. ................. 370/342 |
| 5,995,499 | A | * | 11/1999 | Hottinen et al. ............ 370/337 |
| 6,108,328 | A | * | 8/2000 | Ranta et al. ................. 370/345 |
| 6,141,567 | A | * | 10/2000 | Youssefmir et al. ........ 455/562 |
| 6,144,710 | A | * | 11/2000 | Chen et al. ................. 375/346 |
| 6,177,906 | B1 | * | 1/2001 | Petrus ........................ 342/378 |
| 6,249,518 | B1 | * | 6/2001 | Cui ............................ 370/347 |
| 6,370,131 | B1 | * | 4/2002 | Miya .......................... 370/335 |

OTHER PUBLICATIONS

Lo et al., *Adaptive Equalization and Interference Cancellation for Wireless Communication Systems*, IEEE Transactions on Communications, vol. 47, No. 4, Apr. 1999, pp. 538-545.

Hafeez et al., *Co-Channel Interference Cancellation for D-AMPS Handsets*, Proceedings of the 49th IEEE Vehicular Technology Conference, May 1999, pp. 1026-1031.

Murata et al., *Joint Frequency Offset and Delay Profile Estimation Technique for Nonlinear Co-channel Interference Canceller*, Proceedings of the PIMRC, IEEE, Nov. 1998, pp. 486-490.

Jamal et al., *Adaptive MLSE Performance on the D-AMPS 1900 Channel*, IEEE Transactions on Vehicular Technology, vol. 46, No. 3, Aug. 1997, pp. 634-641.

Merhav et al., *On the Estimation of the Order of a Markov Chain and Universal Data Compression*, IEEE Transactions on Information Theory, vol. 35, No. 5, Sep. 1989, pp. 1014-1019.

Proakis, *Digital Communication, Second Edition*, McGraw-Hill, 1989, pp. 171-178.

Schwarz, *Estimating the Dimension of a Model*, The Annals of Statistics, vol. 6, No. 2, 1978, pp. 461-464.

* cited by examiner

SELECTIVE JOINT DEMODULATION SYSTEMS AND METHODS FOR RECEIVING A SIGNAL IN THE PRESENCE OF NOISE AND INTERFERENCE

BACKGROUND OF THE INVENTION

This invention relates to digital communications, and more particularly to systems and methods for jointly demodulating a received signal in the presence of noise and interference.

Joint demodulation is widely used to detect a desired signal from a received signal that includes an interfering signal as well. In joint demodulation, the desired signal and the interfering signal are both demodulated based on information concerning the desired signal and the interfering signal, so as to obtain a better estimate of the desired signal.

Joint demodulation is described, for example, in U.S. Pat. No. 5,506,861 to Bottomley entitled System and Method for Joint Demodulation of CDMA Signals; U.S. Pat. No. 5,640,432 to Wales entitled Co-Channel Interference Suppression System; and U.S. patent application Ser. No. 09/143,821 to Hafeez et al., entitled Methods and Systems for Reducing Co-Channel Interference Using Multiple Timings for a Received Signal filed on Aug. 31, 1998 (now U.S. Pat. No. 6,304,618 to Hafeez et al.), and assigned to the assignee of the present invention. Joint demodulation also is described in the following publications: Hafeez et al., entitled Co-Channel Interference Cancellation for D-AMPS Handsets, Proceedings of the 49$^{th}$ IEEE Vehicular Technology Conference, May 1999, pp. 1026-1031; Murata et al., entitled Joint Frequency Offset and Delay Profile Estimation Technique for Nonlinear Co-channel Interference Canceller, Proceedings of the PIMRC, November 1998, pp. 486-490; and Lo et al., entitled Adaptive Equalization and Interference Cancellation for Wireless Communication Systems, IEEE Transactions on Communications, Vol. 47, No. 4, April 1999, pp. 538-545. The disclosures of all of the above-cited patents, patent application and publications are hereby incorporated herein by reference in their entirety.

Although joint demodulation can be highly effective in detecting a desired signal from a received signal that includes an interfering signal, joint demodulation may be more complex than standard or conventional demodulation, referred to herein simply as "demodulation", of a received signal. Accordingly, there continues to be a need to provide improved systems and methods for jointly demodulating a received signal in the presence of an interfering signal.

SUMMARY OF THE INVENTION

The present invention receives a signal in the presence of noise and interference by demodulating the signal when a relationship between the signal and the noise and the interference meets a criterion, and by jointly demodulating the signal when the relationship between the signal and the noise and the interference does not meet the criterion. Moreover, the signal may be demodulated if a relationship between the noise and the interference meets a second criterion and may be jointly demodulated if the relationship between the noise and the interference does not meet the second criterion.

The invention stems from a realization that joint demodulation assumes that an interfering signal is present. However, in many cases, the presence of an interfering signal depends on multipath and/or other distortions being introduced into the signal transmission path. Accordingly, the strength of the interfering signal may change over time. When joint demodulation is performed when there is little or no interference, performance of the joint demodulation may be degraded. Moreover, the additional complexity due to joint demodulation may be wasted when there is little or no interfering signal present to cancel.

According to the present invention, consideration is made as to whether standard demodulation is sufficient or whether joint demodulation should be performed. More specifically, demodulation may be performed when the signal-to-noise-and-interference ratio exceeds a first threshold and joint demodulation may be performed when the signal-to-noise-and-interference ratio is less than the first threshold. Moreover, the signal may be demodulated if the interference-to-noise ratio is less than a second threshold, and the signal may be jointly demodulated if the interference-to-noise ratio exceeds the second threshold. Thus, if the desired signal power is high relative to noise and interference, joint demodulation may be skipped and demodulation may be performed. Moreover, if the desired signal power is not large compared to interference-and-noise, joint demodulation may be used only when the interference power is high relative to the noise power.

According to another aspect of the present invention, the interfering signal includes an interfering signal synchronization word. The interfering signal synchronization word is found in the received signal, and the power of the interfering signal relative to the noise power is determined from the interfering signal synchronization word, to thereby determine the interference-to-noise ratio. Thus, the finding of the interfering signal synchronization word can provide the ability to measure the interference-to-noise power and to control the use of joint demodulation. Moreover, the interfering signal synchronization word that is found can provide improved estimation of the interfering signal's channel estimate, which can be estimated in terms of the interfering signal's medium response compared to the composite channel response.

Accordingly, an interfering signal synchronization sequence may be found in a received signal that includes a desired signal having a desired signal synchronization sequence, and an interfering signal having the interfering signal synchronization sequence, by demodulating the received signal to generate an estimate of the desired signal and an estimate of a residual signal. An estimate of a carrier-to-interference-and-noise ratio of the received signal is generated. The interfering signal synchronization sequence then can be found using one of the received signal and the estimate of the residual signal based upon the estimate of the carrier-to-interference-and-noise ratio of the received signal.

More specifically, the interfering signal synchronization sequence may be found by using the received signal if the estimate of the carrier-to-interference-and-noise ratio of the received signal is less than a threshold, and using the estimate of the residual signal if the estimate of the carrier-to-interference-and-noise ratio of the received signal is greater than the threshold. The interfering signal synchronization sequence may be found using one of the received signal and the estimate of the residual signal if the estimate of the carrier-to-interference-and-noise ratio of the received signal exceeds a first threshold. The interfering signal synchronization sequence may be found using the received signal if the estimate of the carrier-to-interference-and-noise ratio of the received signal is less than a second threshold, and the estimate of the residual signal may be used if the estimate of the carrier-to-interference-and-noise ratio of the received signal is greater than the second threshold and less than the first threshold.

Once found, the interfering signal synchronization sequence may be used to estimate an interfering signal's channel response. In particular, a medium response may be estimated for each of a plurality of delays, using the found interfering signal synchronization sequence. A subset of the estimated medium responses is selected to produce a plurality of medium response rays. The medium response rays then are used to estimate the interfering signal's channel response.

Accordingly, standard demodulation and joint demodulation are selectively used where appropriate based on the relationship between the signal, the noise and the interference in a received signal. Standard demodulation may be used when interference is low or absent, whereas joint demodulation may be used when interference is significant.

BRIEF DESCRIPTION OF THE DRAWINGS

FIG. 7 is a block diagram of interfering signal channel estimators of FIG. 2.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
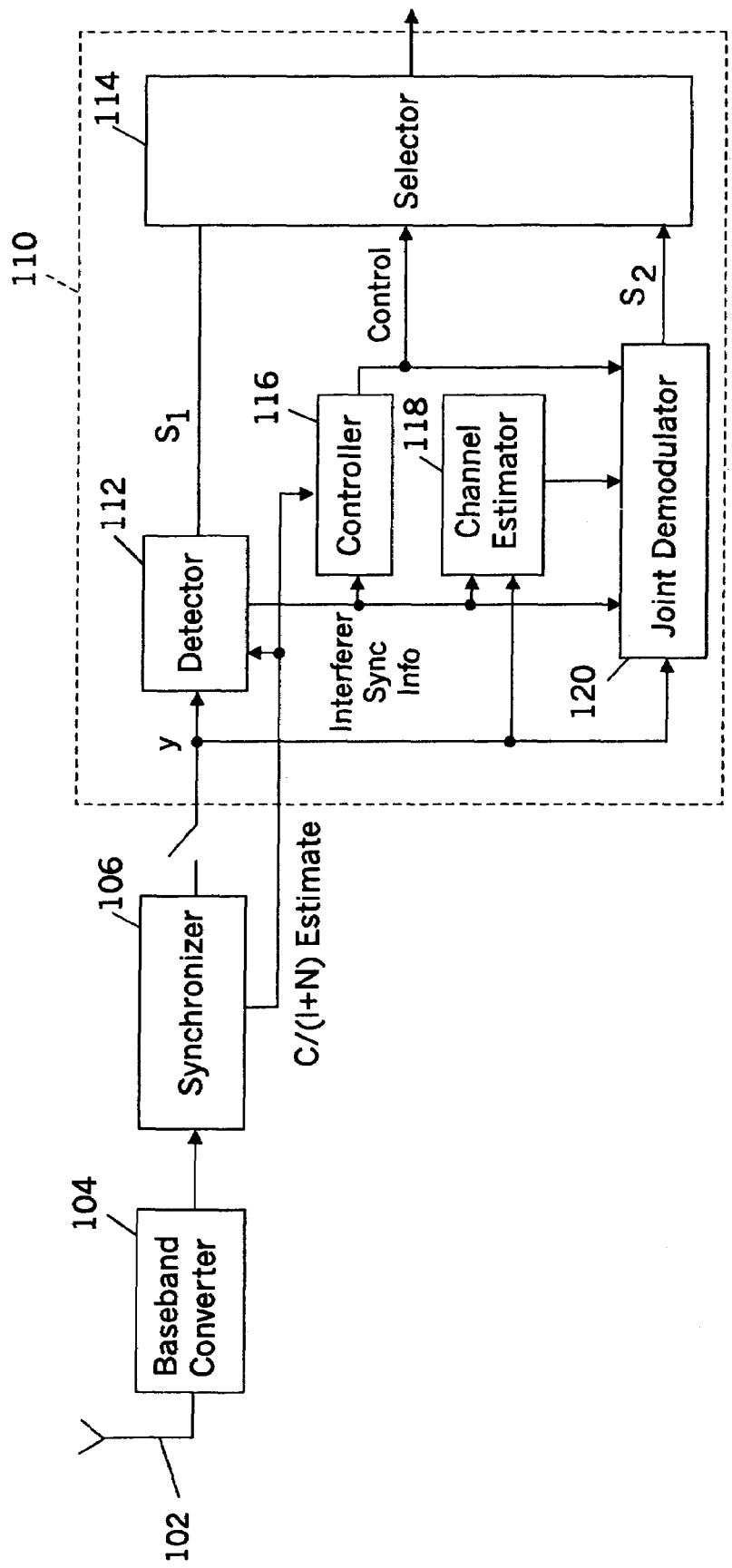
FIGS. 1 and 2 are block diagrams of selective joint demodulation according to the present invention.

FIG. 1 is a block diagram of first embodiments of selective joint demodulation according to the present invention. Referring now to FIG. 1, a received signal is received from an antenna 102 and converted to a baseband representation by a baseband converter 104. Then, the signal may be passed through an analog-to-digital converter, sampled and sent to a synchronizer 106. The signal can be sampled once per symbol or multiple times per symbol, as in the IS-136 Standard.

The synchronizer 106 synchronizes the signal and can further sample the output signal at a rate to be processed by a selective joint demodulator, described below, which can be one or more samples per symbol. The synchronizer 106 also preferably generates an estimate of the carrier-to-interference-and-noise ratio, C/(I+N), which is an estimate of the desired signal strength relative to the combined strength of the noise plus interfering signals.

The received synchronized signal y then is sent to a selective joint demodulator 110. In particular, the synchronized signal is sent to a detector 112, also referred to a demodulator or a standard demodulator, which generates a first detected signal $S_1$, which is then sent to a selector 114. The detector 112 also preferably finds an interfering signal synchronization sequence and estimates an interference-to-noise ratio (I/N) value. The information about the interfering signal synchronization sequence, the I/N estimate and status information output from the detector 112 also are sent to a controller 116. This information may be used, along with the C/(I+N) estimate, to determine whether demodulation or joint demodulation is to be performed and subsequently selected. Additionally, the information about the interfering signal synchronization sequence that is provided by the detector 112, is used along with the received signal y to estimate the interfering signal's channel response by a channel estimator 118. Finally, a joint demodulator 120 uses the received signal y, the interfering signal synchronization information and the interfering signal's channel estimate, to jointly demodulate both the desired signal and the interfering signal, to produce a second detected signal $S_2$, which is sent to the selector 114. Based on the criteria set forth below, either the first detected signal $S_1$ or the second selected signal $S_2$ is selected as the detected signal.

Figure 2:
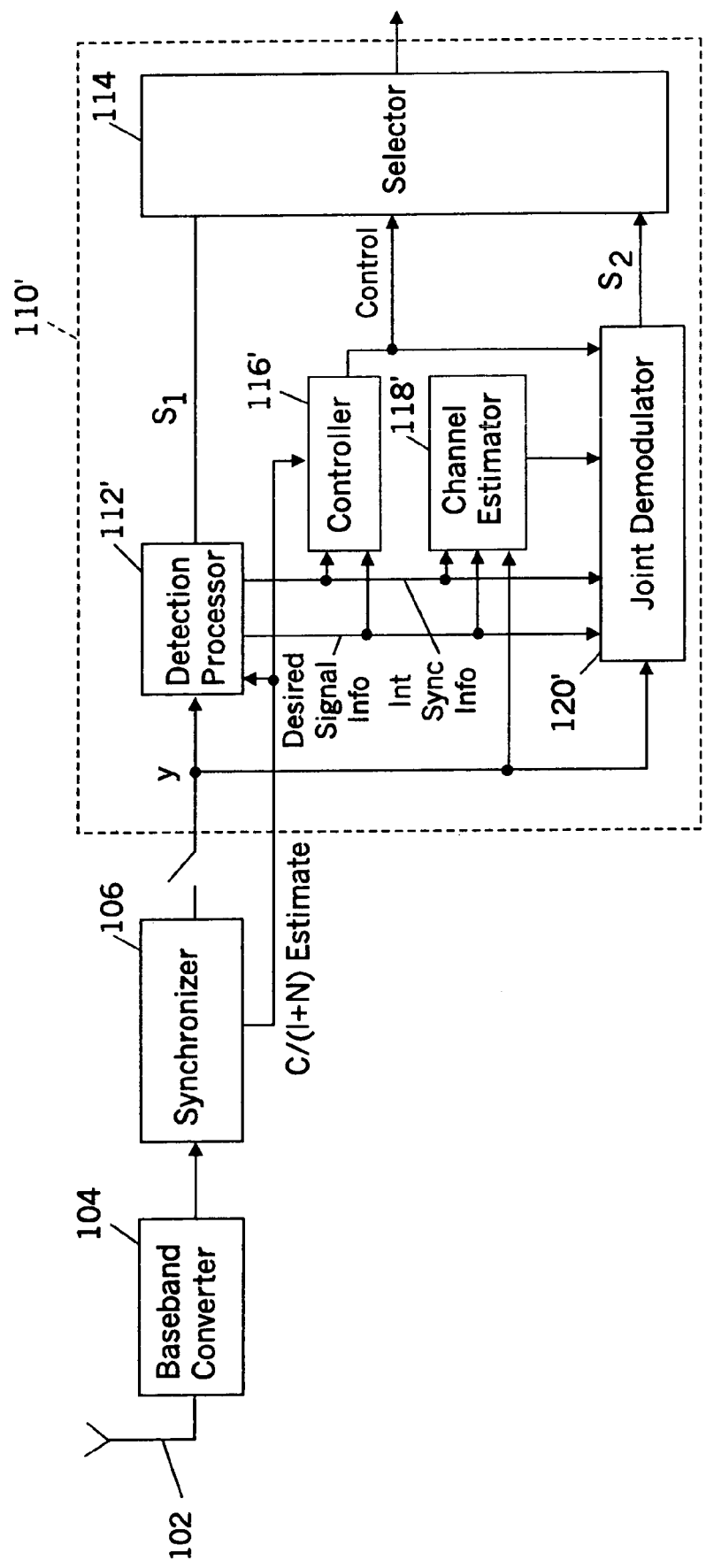

FIG. 2 is a block diagram of alternate embodiments of selective joint demodulation according to the present invention. In FIG. 2, the detector, referred to herein as a detection processor 112', generates information concerning the desired signal as well as interfering signal synchronization information, in a manner that will be described below. The information concerning the desired signal also is provided to the controller 116', a channel estimator 118' and to a joint demodulator 120', for selection for interfering signal channel estimation and for joint demodulation respectively. This information concerning the desired signal can include the desired signal's channel estimate, the detected uncoded bit or symbol information and the coded bit or symbol information, as will be described in detail below.

Figure 3:
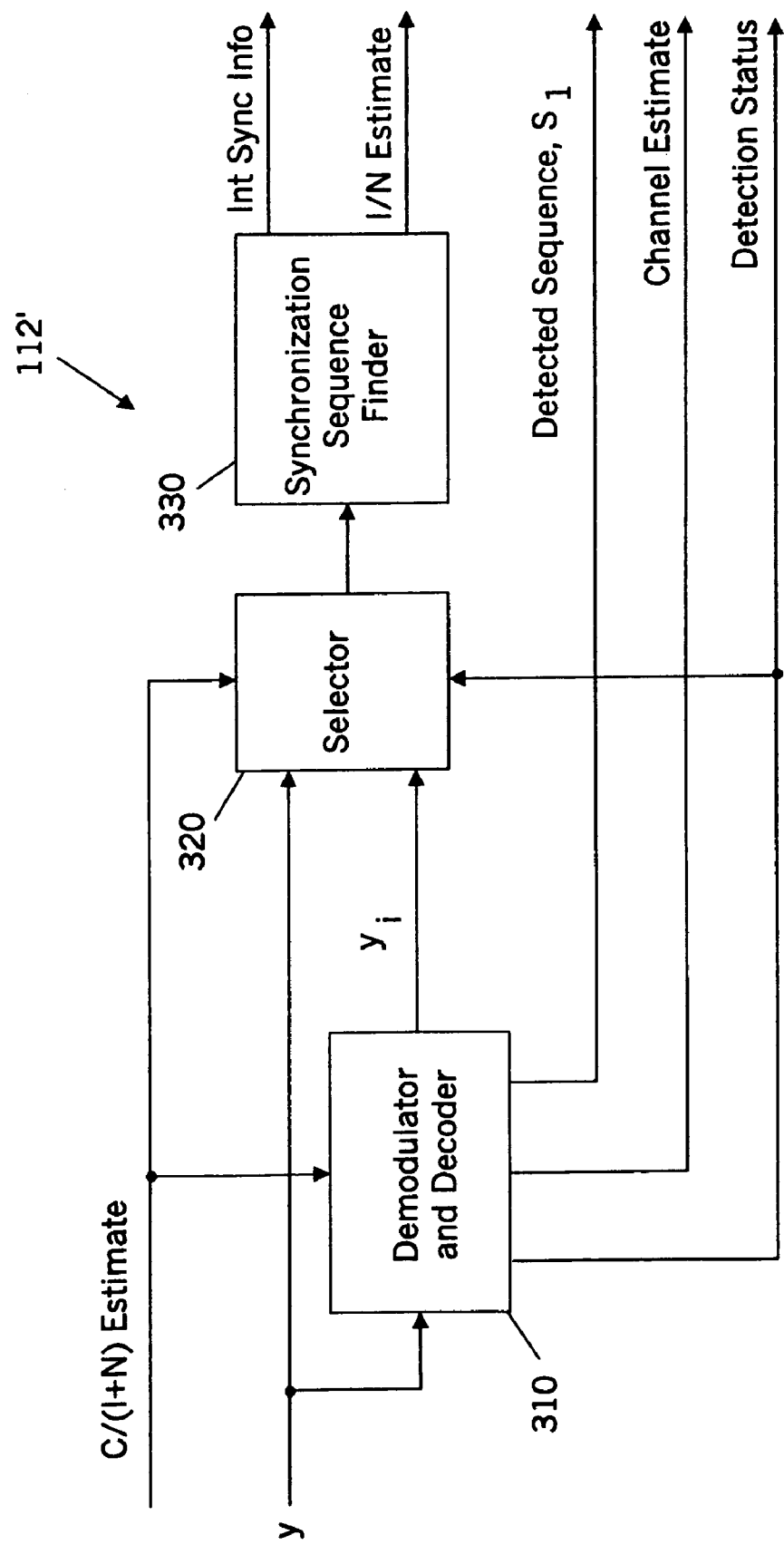
FIG. 3 is a block diagram of detection processors of FIG. 2.

Referring now to FIG. 3, a block diagram of an embodiment of a detection processor 112' of FIG. 2 is shown. The detection processor 112' can detect the desired signal using a conventional demodulation technique. Conventional demodulation can include differential detection as described in Pages 171-178 of the textbook to Proakis entitled *Digital Communications, Second Edition;* 1989; an equalizer that demodulates the desired signal only, such as is described in the publication to Jamal et al. entitled *Adaptive MLSE Performance on the D-AMPS 1900 Channel*, IEEE Transactions on Vehicular Technology, Vol. 46, No. 3, August 1997, pp. 634-641; and/or a semi-blind joint demodulator that demodulates both a desired signal and at least one interfering signal, such as was described in the above-cited publication to Hafeez et al. and the above-cited U.S. patent to Hafeez et al. It will be understood that semi-blind joint demodulation is not considered joint demodulation according to the invention because semi-blind joint demodulation does not use an estimate of an interfering signal's synchronization sequence. The detection processor 112' also may comprise a multipass detection processor that performs demodulation and decoding using multiple iterative passes of demodulation and detection. See application Ser. No. 09/201,623 to Khayrallah et al. entitled *Adoptive Channel Characterization using Decoded Symbols*, filed Nov. 30, 1998 (now U.S. Pat. No. 6,320,219 to Khayrallah et al.). Other detection processors also may be used.

As shown in FIG. 3, the detection processor 112' preferably includes a demodulator and decoder 310 that is responsive to the received signal y and to the C/(I+N) estimate, to produce a residual signal $y_i$, a detected sequence $S_1$, a channel estimate and a detection status such a Cyclic Redundancy Check (CRC). A selector 320 selects either the received signal y or the residual signal $y_i$ based on the C/(I+N) estimate and detection status. The selected signal then is applied to an interfering signal synchronization sequence finder 330, to produce the interfering synchronization sequence information and an I/N estimate.

Figure 4:
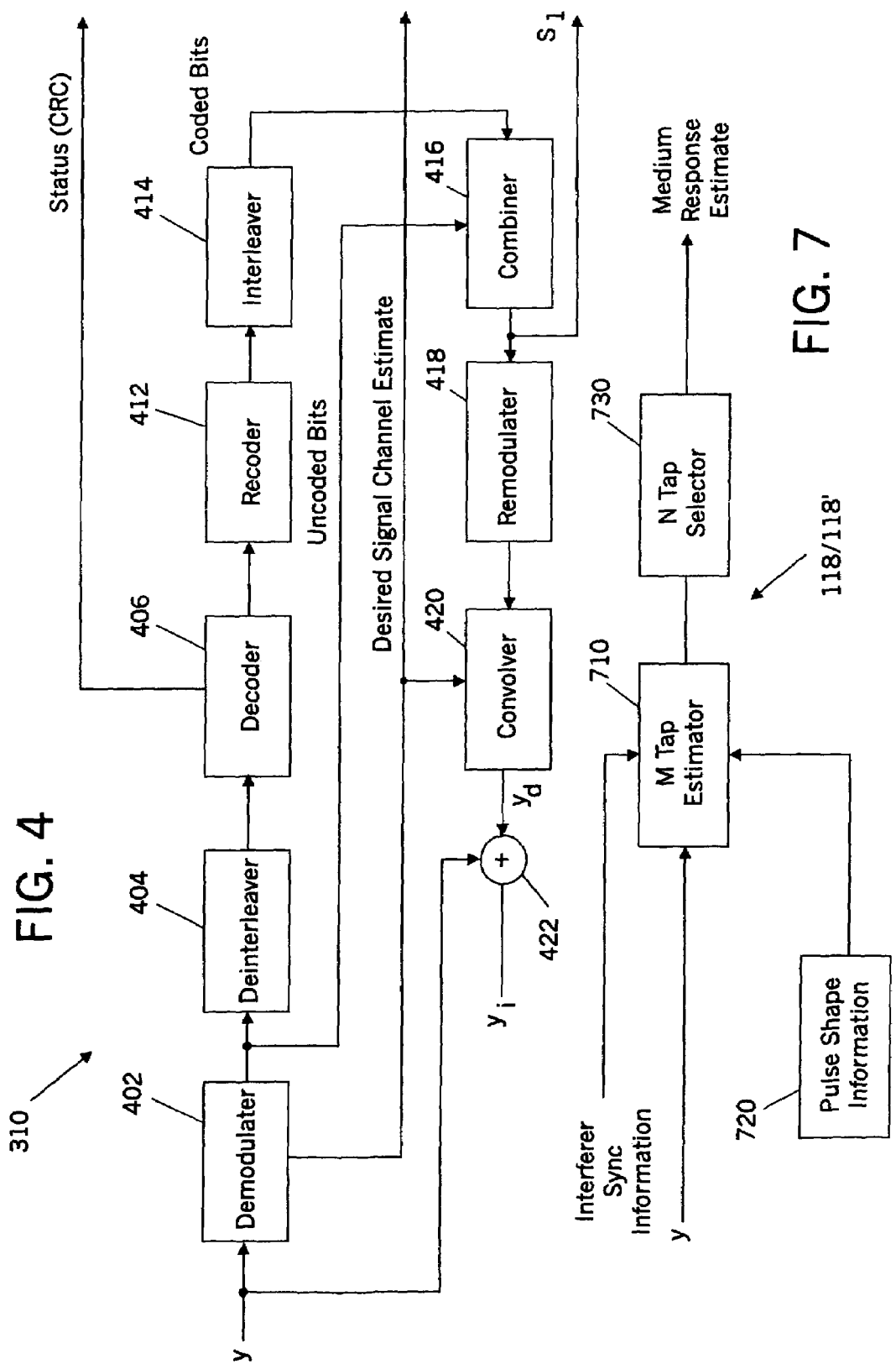
FIG. 4 is a block diagram of demodulators and decoders of FIG. 3.

Referring now to FIG. 4, a preferred embodiment of the demodulator and decoder 310 of FIG. 3 now will be described. As shown in FIG. 4, the received signal y is demodulated, deinterleaved and decoded at blocks 402, 404 and 406, respectively. The decoded bits are decoded, interleaved and combined with the remaining uncoded bits at blocks 412, 414 and 416, respectively, to generate the first signal S1. This signal then is remodulated at remodulator 418 and the desired signal's channel estimate is applied at convolver 420 to generate the desired signal portion $y_d$ of the received signal y. The residual signal $y_i$ then is generated at adder 422 by subtracting the desired signal $y_d$ from the received signal y.

Operation of a selector 320 of FIG. 3 now will be described in detail. FIG. 3 shows the C/(I+N) estimate and available detection status information selecting the received signal y or the residual signal $y_i$ as an input to the synchronization sequence finder 330 which finds the interfering signal's synchronization sequence. This estimate also can control whether to perform the demodulation process if $y_i$ is not to be selected and no other outputs from demodulation are to be used. C/(I+N) or detection status may be used alone, or in combination. If no detection status is present (e.g., no decoding), then, of course, it is not used.

The value of C/(I+N) may be used to control the selection of y or $y_i$ in the following manner: If C/(I+N)>β, then joint demodulation is not performed and the interfering signal synchronization sequence is not identified. If $\alpha \leq C/(I+N) \leq \beta$, then the residual signal $y_i$ is selected as the input to the synchronization sequence finder 330. Finally, if C/(I+N)<α, then the received signal y is selected as the input to the synchronization sequence finder 330. The terms α and β denote thresholds. It will be understood that the estimate of C/(I+N) can be generated within the detector 112/112' as an alternative to generating the estimate by the synchronizer 106, as is detection status such as Cyclic Redundancy Code (CRC) information.

A preferred embodiment of a synchronization sequence finder 330 that finds the interfering signal synchronization sequence using the selected signal y or $y_i$ now will be described. When the interfering signal synchronization has not been detected previously, a search may be performed over the entire desired signal slot, plus any extra samples prior to or after the desired signal's slot. The residual signal $y_i$ generally only can be used over the extent of the desired signal slot, since detected data generally is not detected outside this range. In this case, the received signal outside the desired signal's slot boundaries preferably is used.

Once the interfering signal synchronization sequence has been detected, the range of samples of where to search for the interfering signal's synchronization word can be narrowed to a smaller range of samples around the previously detected synchronization point. There may be multiple possible synchronization sequences corresponding to different users. One approach is to detect the user with the strongest synchronization word. If no interfering signal synchronization word is found, for example, because it is out of range of the search, then either joint demodulation may be turned off or semi-blind joint demodulation may be used (i.e. joint demodulation with no knowledge about the interfering signal).

Figure 5:
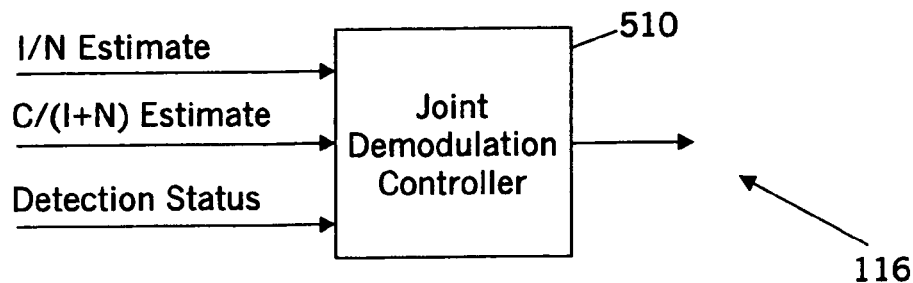
FIG. 5 is a block diagram of controllers of FIGS. 1 and 2.
Figure 6:
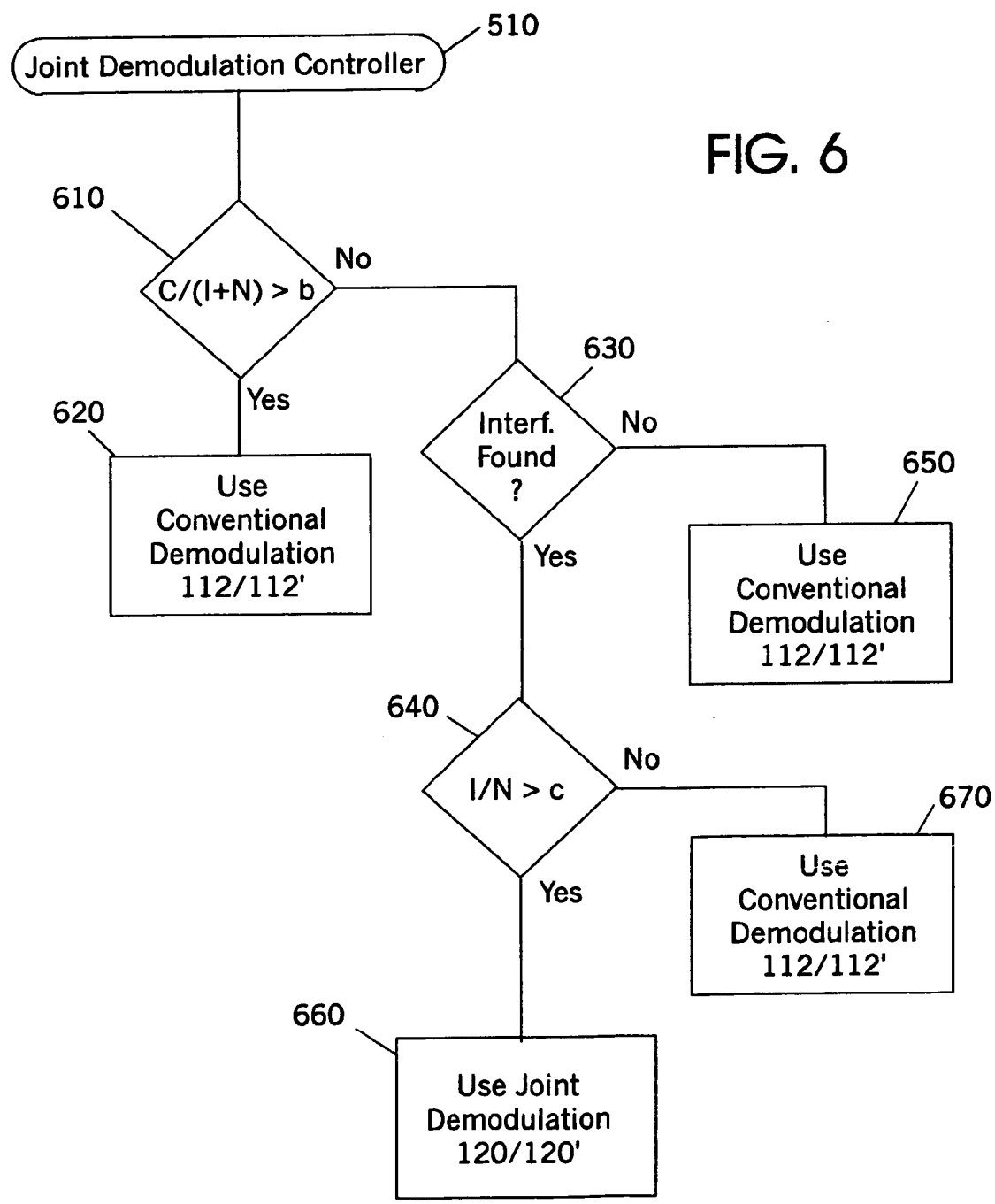
FIG. 6 is a flowchart of operations of controllers of FIG. 5.

A block diagram and flowchart of a controller 116 of FIGS. 1 and 2 are shown in FIGS. 5 and 6, respectively. As shown in FIG. 5, the inputs to a joint demodulation controller 510 include the measured values of C/(I+N) and I/N and the detection status of the interfering signal synchronization sequence.

As shown in FIG. 6, joint demodulation controller 510 can operate as follows: If the value of C/(I+N) is greater than some value b (block 610), then conventional demodulation 112/112' is used (block 620), since the desired signal is strong relative to both noise and interference. If C/(I+N) is not greater than b, block 630 checks if an interfering signal synchronization sequence has been found. If no interfering signal synchronization sequence was found at block 630, then conventional demodulation is used at block 650. If an interfering synchronization sequence was found, block 640 checks if the measured value of I/N is greater than a threshold c. If yes, then joint demodulation 120/120' is performed at block 660. Otherwise, conventional demodulation is performed at block 670.

A detailed description of an interfering signal channel estimator 118/118' now will be performed with reference to FIG. 7. For coherent joint demodulation to be used, an estimate of the interfering signal's channel preferably is obtained. Three different techniques will be described for this purpose.

A first technique estimates the interfering signal's composite channel response. This approach can use a conventional least squares estimation approach using the found synchronization word of the interfering signal. A second technique can assume that there is one medium ray for the interfering signal and estimate its value and delay. This is similar to the approach described in the above-cited U.S. patent to Hafeez et al., except that the interfering signal synchronization word can be used to estimate the delay of the medium response. A third technique according to the invention can generalize the above two techniques. In particular, the number of medium response rays is estimated and for each ray, and a delay and a coefficient value are obtained.

The third technique is described in FIG. 7. In particular, at M predetermined delay values, the medium response for each of these M delays is estimated by M tap estimator 710. The received signal y, the interfering signal synchronization sequence and a known pulse shape response 720 are combined to generate the known signal for each predetermined delay. The medium response values at the predetermined delays then can be estimated, for example using a least squares method. There need be no restriction on the delay values, so that they may be spaced uniformly at a rate equal to or higher than the received data, or they may be sampled non-uniformly with respect to the received signal. However, the pulse-shape response preferably is sampled appropriately for the corresponding delay.

Then, at N tap selector 730, a subset N of M medium response rays is selected, wherein N≦M, using the above M predetermined medium response estimates from M tap estimator 710. The selection of N may be performed using one of the following approaches:

First, a predetermined value of N may be used. The N best rays may be chosen from the M medium response rays computed above. The N best rays may be determined by some criterion, such as the N rays which give the largest energy in the medium response.

Alternatively, it is known that for the desired signal, a decision can be made whether to use one or two composite channel taps by comparing the two metric values $\zeta_1$ and $\zeta_2$ under the assumption that $_1$ models the desired signal with one channel tap and $_2$ models the desired signal with two channel taps. These two metrics are defined as:

$$\gamma_1 = \sum_i |y(i) - c(0)s(i)|^2, \text{ and} \qquad (1)$$

$$\gamma_2 = \sum_i |y(i) - c(0)s(i) - c(1)s(i-1)|^2. \qquad (2)$$

Two taps are selected when $(_2<(_1-^*$, where * is some positive threshold value. See U.S. application Ser. No. 08/897,309, filed Jul. 21, 1997 (now U.S. Pat. No. 6,333,953 to Bottomley et al.), entitled *System and Methods for Selecting an Appropriate Detection Technique in a Radiocommunication System*.

According to the invention, the number of interfering signal taps also may be estimated by the following approach: As an example, let the $l^{th}$ sample of the received signal, sampled with one sample per symbol, be modeled as:

$$\hat{y}_n(lT) = \sum_{i=1}^{J_d} c(i)s_d(l-i) + \sum_{j \in \Omega_n} g(j) \sum_k s_i(l-k)\rho(-jT_s + kT). \qquad (3)$$

Estimates of the composite response for the received signal and of the medium response for the interfering signal may be used. In Equation (3), $J_d$ is the number of taps in the desired signal's composite response, $c(i)$, which are sampled at the symbol rate. The interfering signal's medium response, $g(j)$, has n taps chosen from the M available medium response tap estimates, and this collection of n taps is designed as $\Omega_n$. These n medium response taps are assumed to have delays $jT_s$, where $T_s$ is an integer fraction of the symbol rate T. The term $s_d(l-i)$ is the desired signal's symbol data, $s_i(l-k)$ is the interfering signal's symbol data, and $\rho(-jT_s+kT)$ represents the pulse-shape autocorrelation function. Index k represents the symbols corresponding to non-zero values in the pulse-shape autocorrelation function $\rho(-jT_s+kT)$. In practice, since $\rho(-jT_s+kT)$ may be non-zero for a large number of samples, then index k may represent the symbols that correspond to $|\rho(-jT_s+kT)|>\epsilon$, where $\epsilon$ is some small positive value. The above model can be extended for fractionally-spaced received data, $y(pT_s+lT)$.

To find the number N of interfering signal medium response taps, a metric value $\gamma_n$ is generated for each $n \in \{1, 2, \ldots, M\}$. N is selected as n which minimizes $\gamma_n$. In particular, the metric $\gamma_n$ is formed for $n=1, \ldots, M$ using $$\gamma_n = |y(lT) - \hat{y}_n(lT)|^2 + p(n), \qquad (4)$$

where $\hat{y}_n(lT)$ is described by Equation (3). The term p(n) is a penalty term, such as the information theoretic approach described in Akaike, *A New Look at the Statistical Model Identification*, IEEE Transactions on Automatic Control, Vol. AC-19 No. 6, December 1974, pp. 716-723; Merhav et al., *On the Estimation of the Order of a Markov Chain and Universal Data Compression*, IEEE Transactions on Information Theory, Vol. 35, No. 5, September 1989, pp. 1014-1019; and/or Schwarz, *Estimating the Dimension of a Model*, The Annals of Statistics, Vol. 6, No. 2, 1978, pp. 461-464. For the $n_{max}$ that minimizes $\gamma_n$, $N=n_{max}$ is chosen and the corresponding medium response and delay estimates are selected for use in joint demodulation.

Finally, joint demodulation 120/120' will be described in detail. A preferred embodiment of joint demodulation uses a Viterbi algorithm to jointly estimate the desired and interfering signal symbol sequences, similar to that described in the above-cited U.S. patent to Hafeez et al., However, in the present invention, the interfering signal's synchronization sequence is known and can be used as known symbols within the detection process even if it is offset from the desired signal's synchronization sequence. This can be accomplished, for example, by constraining the demodulation trellis to only allow the known interfering signal's synchronization symbols in the demodulation process. Additionally, the interfering signal's channel estimate generally is more reliable than in the semi-blind joint demodulation receiver, and this channel can be adaptively updated during demodulation. In an alternative embodiment the joint demodulation can take advantage of the first detection of the desired signal and use this information together with joint demodulation. An example of how this information might be used alone (without joint demodulation) is described in the above-cited U.S. patent to Khayrallah et al.

Various aspects of the present invention were illustrated in detail in the figures, including block diagrams and flowchart illustrations. It will be understood that individual blocks of the figures, and combinations of blocks in the figures, can be implemented by computer program instructions. These computer program instructions may be provided to a processor or other programmable data processing apparatus to produce a machine, such that the instructions which execute on the processor or other programmable data processing apparatus create means for implementing the functions specified in the block or blocks. These computer program instructions may also be stored in a computer-readable memory that can direct a processor or other programmable data processing apparatus to function in a particular manner, such that the instructions stored in the computer-readable memory produce an article of manufacture including instructions which implement the functions specified in the block or blocks.

Accordingly, blocks of the figures support combinations of structures that perform the specified functions, combinations of means for performing the specified functions, combinations of steps for performing the specified functions and/or program instructions for performing the specified functions. It will also be understood that individual blocks of the figures, and combinations of blocks in the flowchart illustrations, can be implemented by special purpose hardware-based computer systems which perform the specified functions or steps, or by combinations of special purpose hardware and computer instructions.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A method of receiving a signal in the presence of noise and interference comprising the steps of:
   demodulating the signal when a relationship between the signal and the noise and the interference meets a first value;
   demodulating the signal if a relationship between the noise and the interference meets a second value that is different from the first value; and
   jointly demodulating the signal if the relationship between the noise and the interference does not meet the second value.

2. A method according to claim 1:
   wherein the step of demodulating the signal when the relationship between the signal and the noise and the interference meets the first value comprises the step of demodulating the signal when a signal-to-noise-and-interference ratio exceeds a first threshold;
   wherein the step of demodulating the signal if the relationship between the noise and the interference meets the second value comprises the step of demodulating the signal if an interference-to-noise ratio is less than a second threshold; and
   wherein the step of jointly demodulating comprises the step of jointly demodulating the signal if the interference-to-noise ratio exceeds the second threshold.

3. A method according to claim 2 wherein the interference comprises an interfering signal including an interfering signal synchronization word, and wherein the step of jointly demodulating comprises the steps of:
   locating the interfering signal synchronization word in the received signal; and
   determining power of the interfering signal relative to noise power from the located interfering signal synchronization word, to thereby determine the interference-to-noise ratio.

4. A method according to claim 3 wherein the step of jointly demodulating further comprises the step of jointly demodulating the signal in response to the located interfere signal synchronization word.

5. A method for detecting a desired signal that includes a desired signal synchronization sequence, from a received signal that includes an interfering signal having an interfering signal synchronization sequence, the desired signal detecting method comprising the steps of:
   synchronizing the received signal;
   generating a first desired signal, an estimate of an interference-to-noise ratio of the received signal and an identification of the interfering signal synchronization sequence from the synchronized received signal;
generating an estimate of a carrier-to-interference-and-noise ratio of the received signal;
   jointly demodulating the received signal in response to the identification of the interfering signal synchronization sequence, to generate a second desired signal; and
   selecting one of the first desired signal and the second desired signal based upon the estimate of the carrier-to-interference-and-noise ratio of the received signal and the estimate of the interference-to-noise ratio of the received signal.

6. A method according to claim 5:
   wherein the jointly demodulating step is further responsive to the first desired signal to generate the second desired signal.

7. A method according to claim 5 further comprising the step of:
   estimating an interfering signal channel in response to the synchronized received signal and to the identification of the interfering signal synchronization sequence, to generate a channel estimate for the interfering signal, wherein the step of jointly demodulating also is responsive to the channel estimate for the interfering signal.

8. A method according to claim 5 wherein the selecting step comprises the step of selecting the second desired signal when the carrier-to-interference-and-noise ratio is less than a first threshold and when the interference-to-noise ratio is greater than a second threshold, or selecting the first desired signal otherwise.

9. A method for locating an interfering signal synchronization sequence in a received signal that includes a desired signal having a desired signal synchronization sequence and an interfering signal having the interfering signal synchronization sequence, the method comprising the steps of:
   demodulating the received signal to generate an estimate of the desired signal and an estimate of a residual signal;
   generating an estimate of a carrier-to-interference-and-noise ratio of the received signal;
   selecting one of the received signal and the estimate of the residual signal, based upon the estimate of the carrier-to-interference-and-noise ratio of the received signal; and
   finding the interfering signal synchronization sequence ir response to the selected one of the received signal and the estimate of the residual signal.

10. A method according to claim 9 wherein the step of selecting comprises the steps of:
   selecting the received signal, if the estimate of the carrier-to-interference-and-noise ratio of the received signal is less than a threshold; and
selecting the estimate of the residual signal, if the estimate of the carrier-to-interference-and-noise ratio of the received signal is greater than the threshold.

11. A method according to claim 9 wherein the step of selecting comprises the step of selecting one of the received signal and the estimate of the residual signal, if the estimate of the carrier-to-interference-and-noise ratio of the received signal exceeds a threshold.

12. A method according to claim 9 wherein the demodulating step comprises the steps of:
   demodulating the received signal to generate the estimate of the desired signal; and
subtracting the estimate of the desired signal from the received signal to generate the estimate of the residual signal.

13. A method according to claim 12 wherein the step of demodulating the received signal to generate the estimate of the desired signal comprises the steps of:
   demodulating the received signal to generate uncoded bits;
   decoding the demodulated signal;
   recoding the decoded signal to generate coded bits;
   combining the coded bits and a set of uncoded bits not used for decoding to generate a detected sequence;
   remodulating the detected sequence; and
   applying the remodulated detected sequence with a desired signal channel estimate to generate the estimate of the desired signal.

14. A method according to claim 11 wherein the threshold is a first threshold and wherein the step of selecting comprises the steps of:
   selecting the received signal if the estimate of the carrier-to-interference-and-noise ratio of the received signal is less than a second threshold; and
   selecting the estimate of the residual signal, if the estimate of the carrier-to-interference-and-noise ratio of the received signal is greater than the second threshold and less than the first threshold.

15. A method according to claim 9 wherein the finding step is followed by the step of:
   estimating an interfering channel response from the found interfering signal synchronization sequence.

16. A method according to claim 15 wherein the estimating step comprises the steps of:

estimating a medium response for each of a plurality of delays, in response to the found interfering signal synchronization sequence;

selecting a subset of the estimated medium responses to produce a plurality of medium response rays; and estimating the interfering channel response in response to the medium response rays.

17. A system for receiving a signal in the presence of noise and interference, comprising:

a demodulator that is responsive to a relationship between the signal and the noise and the interference meeting a first value and also is responsive to a relationship between the noise and the interference meeting a second value that is different from the first value; and a joint demodulator that is responsive to the relationship between the noise and the interference not meeting the second value.

18. A system according to claim 17:

wherein the demodulator is responsive to a signal-to-noise-and-interference ratio exceeding a first threshold and wherein the demodulator also is responsive to an interference-to-noise ratio being less than a second threshold; and wherein the joint demodulator is responsive to the interference-to-noise ratio exceeding the second threshold.

19. A system according to claim 18 wherein the interference comprises an interfering signal including an interfering signal synchronization word, and wherein the joint demodulator locates the interfering signal synchronization word in the received signal, and determines power of the interfering signal relative to noise power from the located interfering signal synchronization word, to thereby determine the interference-to-noise ratio.

20. A system according to claim 19 wherein the joint demodulator jointly demodulates the signal in response to the located interfering signal synchronization word.

21. A system for detecting a desired signal that includes a desired signal synchronization sequence, from a received signal that includes an interfering signal having an interfering signal synchronization sequence, the desired signal detecting system comprising:

a synchronizer that synchronizes the received signal;

a detector that is responsive to the synchronizer to generate a first desired signal, an estimate of an interference-to-noise ratio of the received signal and an identification of the interfering signal synchronization sequence, at least one of the synchronizer and the detector also generating an estimate of a carrier-to-interference-and-noise ratio of the received signal;

a joint demodulator that is responsive to the synchronizer and to the identification of the interfering signal synchronization sequence, to generate a second desired signal; and a selector that selects one of the first desired signal and the second desired signal based upon the estimate of the carrier-to-interference-and-noise ratio of the received signal and the estimate of the interference-to-noise ratio of the received signal.

22. A system according to claim 21:

wherein the joint demodulator is further responsive to the first desired signal to generate the second desired signal.

23. A system according to claim 21 further comprising:

an interfering signal channel estimator that is responsive to the synchronized received signal and to the identification of the interfering signal synchronization sequence to generate a channel estimate for the interfering signal, wherein the joint demodulator also is responsive to the channel estimate for the interfering signal.

24. A system according to claim 21 wherein the selector selects the second desired signal when the carrier-to-interference-and-noise ratio is less than a first threshold and when the interference-to-noise ratio is greater than a second threshold, and selects the first desired signal otherwise.

25. A system for locating an interfering signal synchronization sequence in a received signal that includes a desired signal having a desired signal synchronization sequence and an interfering signal having the interfering signal synchronization sequence, the system comprising:

a demodulator that is responsive to the received signal to generate an estimate of the desired signal and an estimate of a residual signal;

a carrier-to-interference-and-noise ratio estimate generator that generates a carrier-to-interference-and noise ratio; and an interfering signal synchronization sequence finder that is responsive to one of the received signal and the estimate of the residual signal if an estimate of the carrier-to-interference-and-noise ratio of the received signal exceeds a first threshold, wherein the interfering signal synchronization sequence finder is responsive to the received signal if the estimate of the carrier-to-interference-and-noise ratio of the received signal is less than a second threshold, and is responsive to the estimate of the residual signal if the estimate of the carrier-to-interference-and-noise ratio of the received signal is greater than the second threshold and less than the first threshold.

26. A system for locating an interfering signal synchronization sequence in a received signal that includes a desired signal having a desired signal synchronization sequence and an interfering signal having the interfering signal synchronization sequence, the system comprising:

a demodulator that is responsive to the received signal to generate an estimate of the desired signal and an estimate of a residual signal;

a carrier-to-interference-and-noise ratio estimate generator that generates carrier-to-interference-and noise ratio; and an interfering signal synchronization sequence finder that is responsive to one of the received signal and the estimate of the residual signal, based upon an estimate of the carrier-to-interference-and-noise ratio of the received signal, wherein the demodulator demodulates the received signal to generate uncoded bits, decodes the demodulated signal, recodes the decoded signal to generate coded bits, combines the coded bits and the uncoded bits to generate a detected sequence, remodulates the detected sequence and applies the remodulated detected sequence with a desired signal channel estimate to generate the estimate of the desired signal, and wherein the demodulator subtracts the estimate of the desired signal from the received signal to generate the estimate of the residual signal.

27. A system for locating an interfering signal synchronization sequence in a received signal that includes a desired signal having a desired signal synchronization sequence and an interfering signal having the interfering signal synchronization sequence, the system comprising:

a demodulator that is responsive to the received signal to generate an estimate of the desired signal and an estimate of a residual signal;

a carrier-to-interference-and-noise ratio estimate generator that generates carrier-to-interference-and-noise ratio;

an interfering signal synchronization sequence finder that is responsive to one of the received signal and the estimate of the residual signal, based upon an estimate of the carrier-to-interference-and-noise ratio of the received signal; and an interfering channel response estimator that is responsive to a found interfering signal synchronization sequence, wherein the interfering channel response estimator comprises:

a medium response estimator that estimates a medium response for each of a plurality of delays, in response to the found interfering signal synchronization sequence;

a selector that selects a subset of the estimated medium responses to produce a plurality of medium response rays; and wherein the interfering channel response estimator is responsive to the medium response rays to estimate an interfering channel response.

* * * * *